(12) United States Patent
Bester et al.

(10) Patent No.: US 9,378,254 B2
(45) Date of Patent: Jun. 28, 2016

(54) DATA MIGRATION IN A DATABASE MANAGEMENT SYSTEM

(71) Applicant: International Business Machines Corporation, Armonk, NY (US)

(72) Inventors: Karla Bester, Ridgewood (AU); Allan T. Chandler, Floreat (AU); Mark A. Shewell, Perth (AU); Stephen J. Yates, Beaconsfield (AU)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 13/843,446

(22) Filed: Mar. 15, 2013

(65) Prior Publication Data

US 2014/0279914 A1 Sep. 18, 2014

(51) Int. Cl.
G06F 17/30 (2006.01)
G06F 7/00 (2006.01)
G06F 11/20 (2006.01)

(52) U.S. Cl.
CPC .... *G06F 17/30563* (2013.01); *G06F 17/30578* (2013.01); *G06F 11/2082* (2013.01); *G06F 17/30575* (2013.01); *G06F 17/30893* (2013.01)

(58) Field of Classification Search
USPC ......................................................... 707/640
See application file for complete search history.

(56) References Cited

U.S. PATENT DOCUMENTS

| 5,548,758 | A | 8/1996 | Pirahesh et al. |
| 5,717,924 | A | 2/1998 | Kawai |
| 5,819,254 | A | 10/1998 | Kawai |
| 7,236,991 | B2 | 6/2007 | Becker et al. |
| 8,688,622 | B2 * | 4/2014 | Willson ......................... 707/600 |
| 8,782,101 | B1 | 7/2014 | Moore |
| 2004/0133591 | A1 * | 7/2004 | Holenstein et al. ........... 707/102 |
| 2006/0136443 | A1 | 6/2006 | Dulay et al. |
| 2007/0079140 | A1 | 4/2007 | Metzger et al. |
| 2008/0228550 | A1 | 9/2008 | Tan et al. |
| 2009/0327208 | A1 | 12/2009 | Bittner et al. |
| 2012/0095957 | A1 * | 4/2012 | Reddy et al. .................. 707/602 |
| 2013/0173546 | A1 | 7/2013 | Cline et al. |
| 2013/0325788 | A1 * | 12/2013 | Brown et al. ................. 707/602 |
| 2014/0279914 | A1 | 9/2014 | Bester et al. |

OTHER PUBLICATIONS

SQL Plus User's Guide and Reference Release 9.0.1 Jul. 2001 Part No. A88827-02.*
Chapter 11—Developing: Applications—Migrating Oracle SQL and PL/SQL—Apr. 27, 2005.*
Larsen, "Transferring Data from One Table to Another," Database Journal, An IT Business Edge Site, May 31, 2005, pp. 1-9.
Watt et al., "SQL *Plus User's Guide and Reference," Oracle Corporation, Release 9.0.1, Jul. 2001, Part No. A88827-02, pp. 1-432.

* cited by examiner

*Primary Examiner* — Kuen Lu
(74) *Attorney, Agent, or Firm* — Van Leeuwen & Van Leeuwen; David Zwick (57) ABSTRACT

An approach is provided to copy records between tables in a relational database. In the approach, a Structured Query Language (SQL) table COPY statement is received with the COPY statement identifying a source table and a target table. Table column names are retrieved from a metadata that corresponds to the source table. The retrieved table column names are used to generate an SQL statement that includes an INSERT INTO clause pertaining to the target table and a SELECT clause pertaining to the source table, wherein the INSERT INTO clause includes a set of target column names and wherein the SELECT clause includes a set of corresponding source column names.

20 Claims, 7 Drawing Sheets

DATA MIGRATION IN A DATABASE MANAGEMENT SYSTEM

TECHNICAL FIELD

The present disclosure relates to an approach that provides a flexible mechanism for copying data from one relational database table to another.

BACKGROUND OF THE INVENTION

In a typical relational database management system (DBMS), data is stored within columns of a table. A DBMS usually contains multiple databases, with each database containing one or more tables and each table containing one or more columns. There are a great many situations where data needs to be copied from one table to another. These situations include, but are not limited to data migrations (changes to the database layout and/or content when software is upgraded with new functionality or problem fixes), "dispersal" of data (such as separating a single large database into geographical regions, or splitting the data in some other manner), and creation of test and development environments from production data, or duplication of those environments for parallel development/testing. In many of these situations, the data being transferred is substantial (tables with many hundreds of columns) but subject to relatively small changes, such as changing column data types for migration, or protecting sensitive data when transferring from production to development and test environments. Existing approaches for copying data from one table to another are cumbersome and prone to error.

SUMMARY

An approach is provided to copy records between tables in a relational database. In the approach, a Structured Query Language (SQL) table COPY statement is received with the COPY statement identifying a source table and a target table. Table column names are retrieved from a metadata that corresponds to the source table. The retrieved table column names are used to generate an SQL statement that includes an INSERT INTO clause pertaining to the target table and a SELECT clause pertaining to the source table, wherein the INSERT INTO clause includes a set of target column names and wherein the SELECT clause includes a set of corresponding source column names.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
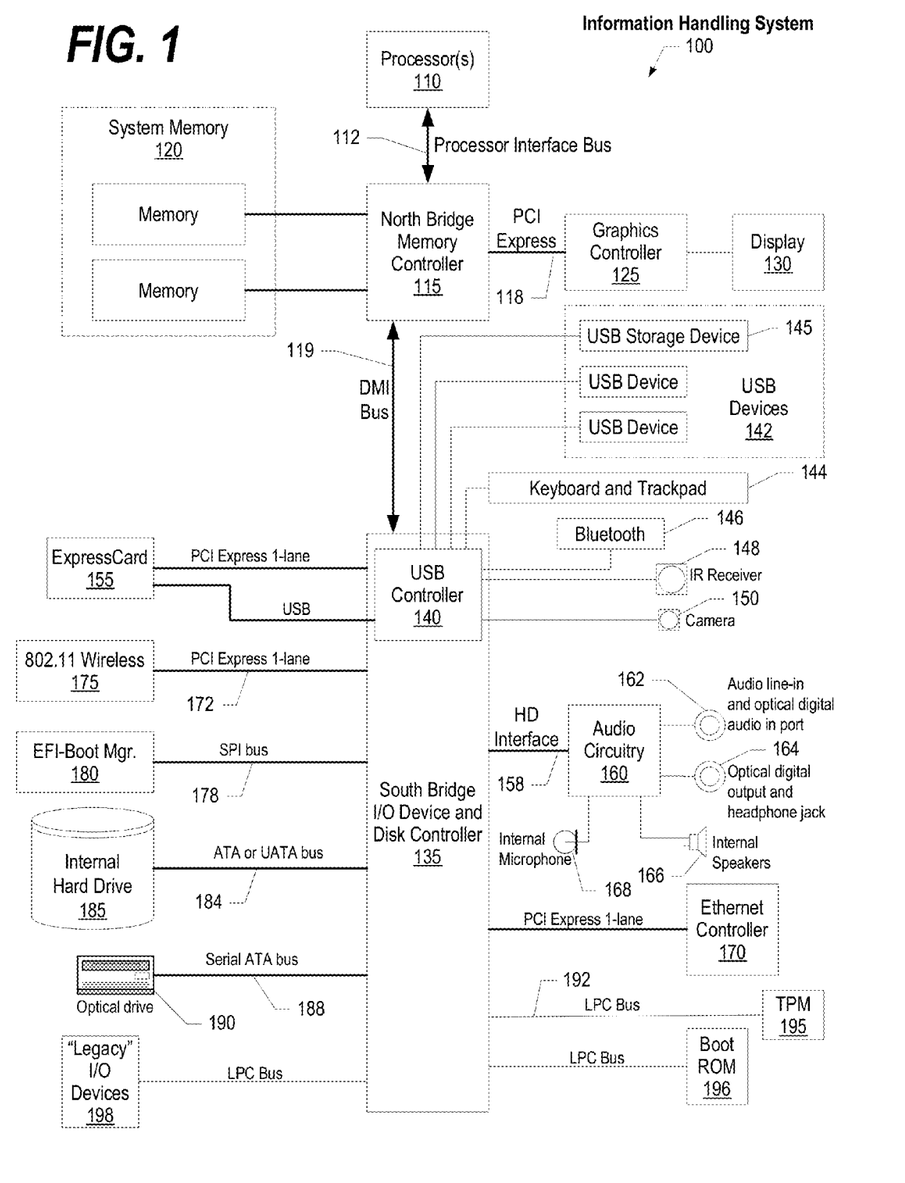
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus (192). The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. EFI (Extensible Firmware Interface) boot manager 180 connects to Southbridge 135 using Serial Peripheral Interface (SPI) Bus 178. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
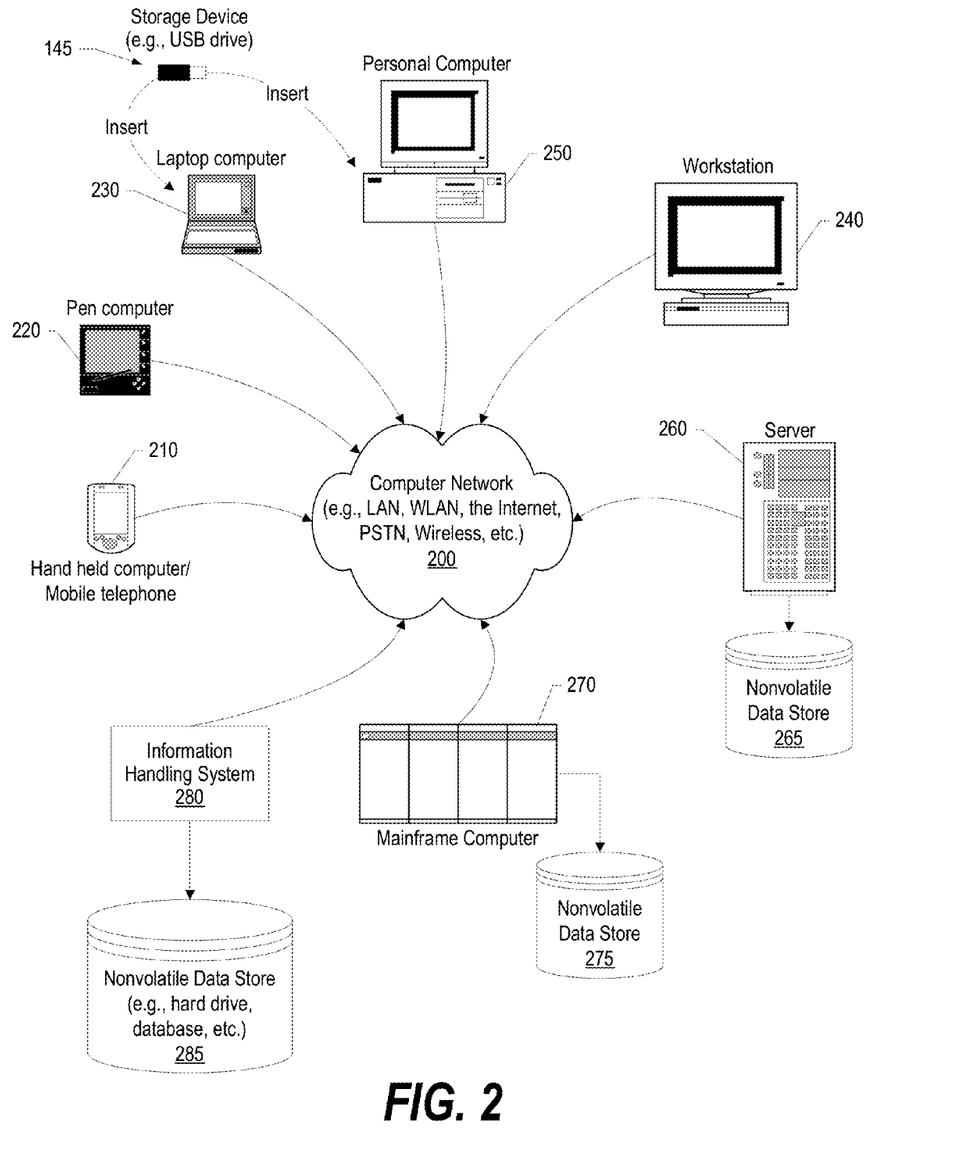
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-7 depict an approach that can be executed on an information handling system, such as a mobile device, and computer network as shown in FIGS. 1-2. This invention discloses a method and apparatus for copying data between relational database tables. The approach provides a way of mass data transfer which is simpler and less error-prone than traditional approaches, while at the same time providing greater flexibility in the transfer operation.

The approach described herein is to provide language extensions to permit greatly simplified specification of mass data transfer between tables, while at the same time providing flexibility in terms of manipulating the data during the transfer. Specifically, the approach: (a) by default copies data from all matching column names from the source table to the target table; (b) achieves implicit data manipulations during the data transfer (for example, changing data types from integer to float); (c) explicitly specifies data manipulations between columns during the data transfer; (d) enables error detection and recovery in the event the specification is incorrect, or the requested data manipulation is not possible; (e) automatically handles unforeseen mismatches between the source and destination table; and (f) specifies a selection clause to copy only specific rows from the source table to the destination table. In one embodiment, changes are provided to the language processor, and other parts of the DBMS, to enact the approach. This approach is a simplified way to copy data from one table to another, by transferring by default all columns in the source table to the same name columns in the target table. During the data transfer, data is automatically converted from the source table column data type to the target table column data type, where possible. This approach allows the user to also manipulate the data transfer by: (a) marking specific source columns as not required in the target table; (b) setting target columns to a formula (such as "current timestamp"); (c) specifying what to do if source column (not marked in (a) above) does not have a corresponding target column—for example error or ignore column (not required in target table); (d) specifying actions to take if a target column (not marked in (b) above) does not have a corresponding source column—for example error, set to default, or set to NULL. An example syntax of the COPY statement is provided in the syntax diagram below:

```
COPY -> [source] -> TO -> [target] -+---------------------*
                       |            ^ |
                       |            | |
                       *-> [where-clause]   -* |
                                            |
       *-----------------------------------------*
       |
  *-+------------------+----------------------------------//
  |   ^ |              ^ |                             ^ |      ^
  |   | |              | |                             | |      |
  *-> [set-clause] -*  *-> [drop-clause]           -* *-> [error-clause]   -*
where-clause: ** standard where clause syntax **
set-clause:
       SET ---> [column-name] -> TO -> [formula]         -+-//
           ^                                               |
           |                                               |
           *
drop-clause:
       DROP ---> [column-name] -+-//
            ^                   |
            |                   |
            *--------, <------*
error-clause:
       ON ERROR -+------------------+--------------------//
                 |      ^ |         |      ^
                 |      | |         |      |
                 *-> SOURCE-FAIL -+  *-> TARGET-FAIL ----+
                 |                |  |                   |
                 *-> SOURCE-DROP -+  *-> TARGET-DEFAULT -+
                                     |                   |
                                     *-> TARGET-NULL ----+
```

In the following example, the COPY statement is used to copy data from a source table (OldEmployees) to a new table (NewEmployees). The OldEmployees table has columns of StartDate, FirstName, LastName, Salary, and SocialSecurityNumber. However, the user wishes to only copy those records where the StartDate is on or after Jan. 1, 2010, wishes to concatenate the employees' first and last names (from the source table) together with a space in between to replace the value of an existing column called FullName in the target table, wishes to increase the salary by five percent, and wishes to hide the social security number (SSN) by replacing the SSN with the string '000-00-0000'. The following COPY statement will accomplish this task:

```
COPY OldEmployees to NewEmployees
    WHERE StartDate >= '2010-01-01'
    SET   FullName = FirstName | ' ' | LastName,
          Salary = Salary * 1.05,
          SocialSecurityNumber = '000-000-0000'
    DROP  FirstName,
          LastName;
```

This single SQL COPY statement will (a) identify all common columns between old table and new table; (b) combine FirstName and LastName columns from old table into a single FullName column in the new table (explicitly specified by user); (c) increase Salary by five percent (explicitly specified by user); (d) hide the SocialSecurityNumber (explicitly specified by user); (e) not copy the FirstName and LastName columns to the new table (explicitly specified by user). Furthermore, in one embodiment, the above COPY statement additionally (f) copies all remaining common columns from old table to new table (implicit—not specified by user), and in the process change Salary from Integer data type to Float (implicit—not specified by user). In this example StartDate is the only common column which is copied by default.

The following two tables show an example of the OldEmployees table and how the NewEmployees table appears after execution of the COPY statement against the data in the OldEmployees table.

Example of OldEmployees Table:

| StartDate     | FirstName | LastName | Salary | SSN          |
|---------------|-----------|----------|--------|--------------|
| 2001 Jan. 1   | JOHN      | SMITH    | 50000  | 001-234-9876 |
| 2010 Jan. 1   | ANDREW    | BLACK    | 60000  | 023-433-8224 |
| 2010 Jan. 1   | ANN       | WHITE    | 98000  | 186-911-2222 |
| 2010 Jan. 1   | JACK      | BROWN    | 33000  | 002-862-1198 |
| 2010 Jan. 2   | LESLIE    | SUMMERS  | 112000 | 098-295-1971 |
| 2010 Dec. 31  | FRANK     | PALMER   | 74000  | 000-195-0998 |
| 2010 Dec. 31  | OLIVE     | GREEN    | 150000 | 002-000-0001 |

Resulting NewEmployees table after execution of sample COPY statement:

| StartDate     | FullName       | Salary   | SSN          |
|---------------|----------------|----------|--------------|
| 2010 Jan. 1   | ANDREW BLACK   | 63000.0  | 000-00-0000  |
| 2010 Jan. 1   | ANN WHITE      | 102900.0 | 000-00-0000  |
| 2010 Jan. 1   | JACK BROWN     | 34650.0  | 000-00-0000  |
| 2010 Jan. 2   | LESLIE SUMMERS | 117600.0 | 000-00-0000  |
| 2010 Dec. 31  | FRANK PALMER   | 77700.0  | 000-00-0000  |
| 2010 Dec. 31  | OLIVE GREEN    | 157500.0 | 000-00-0000  |

The following process map shows the internal processing which occurs during processing of the example COPY SQL statement shown above. In the first step, the process determines common column names between the source table and the target (destination) table for implicit data transfer. Using the columns from the example table above, the result of the first step is as follows:
 StartDate
 FirstName
 LastName
 Salary
 SSN In the second step, the process creates an interim SQL statement to copy data from the source table to the target table. Using the columns from the example table above, the result of the second step is as follows:

```
INSERT INTO NewEmployees
    (StartDate
    ,FirstName
    ,LastName
    ,Salary
    ,SocialSecurityNumber)
SELECT
    StartDate
    ,FirstName
    ,LastName
    ,Salary
    ,SocialSecurityNumber
FROM OldEmployees
```

In the third step, the process adds new destination (target) columns to the interim SQL statement where explicitly specified (e.g., the FullName column). Using the columns from the example table above, the result of the third step is as follows:

```
INSERT INTO NewEmployees
    (StartDate
    ,FirstName
    ,LastName
    ,Salary
    ,SocialSecurityNumber
    ,FullName)
SELECT
    StartDate
    ,FirstName
    ,LastName
    ,Salary
    ,SocialSecurityNumber
    ,FirstName concat ' ' concat LastName
FROM OldEmployees
```

In the fourth step, the process updates the source columns in the interim SQL statement where data manipulation has been explicitly specified by the user (e.g., salary increased by five percent, SSN hidden). Using the columns from the example table above, the result of the fourth step is as follows:

```
INSERT INTO NewEmployees
    (StartDate
    ,FirstName
    ,LastName
    ,Salary
    ,SocialSecurityNumber
    ,FullName)
SELECT
    StartDate
    ,FirstName
    ,LastName
    ,Salary*1.05
    ,'000-00-0000'
    ,FirstName concat ' ' concat LastName
FROM OldEmployees
```

In the fifth step, the process removes source and destination columns from the interim SQL statement where the DROP statement explicitly specifies those columns that are to be removed from the target table excluded from the data transfer (e.g., FirstName and LastName). Using the columns from the example table above, the result of the fifth step is as follows:

```
INSERT INTO NewEmployees
    (StartDate
    ,Salary
    ,SocialSecurityNumber
    ,FullName)
SELECT
    StartDate
    ,Salary*1.05
    ,'000-00-0000'
    ,FirstName concat ' ' concat LastName
FROM OldEmployees
```

In the sixth step, the process adjusts the SQL statement based on any 'ON ERROR' clauses found in the COPY statement. For example, the 'ON ERROR' clause might be used to handle mismatches between the source and destination (target) tables. In the final, seventh step the SQL statement is executed (e.g., providing the results shown in the NewEmployees table above). Further examples and descriptions are found in FIGS. 3-7, which are described below.

Figure 3:
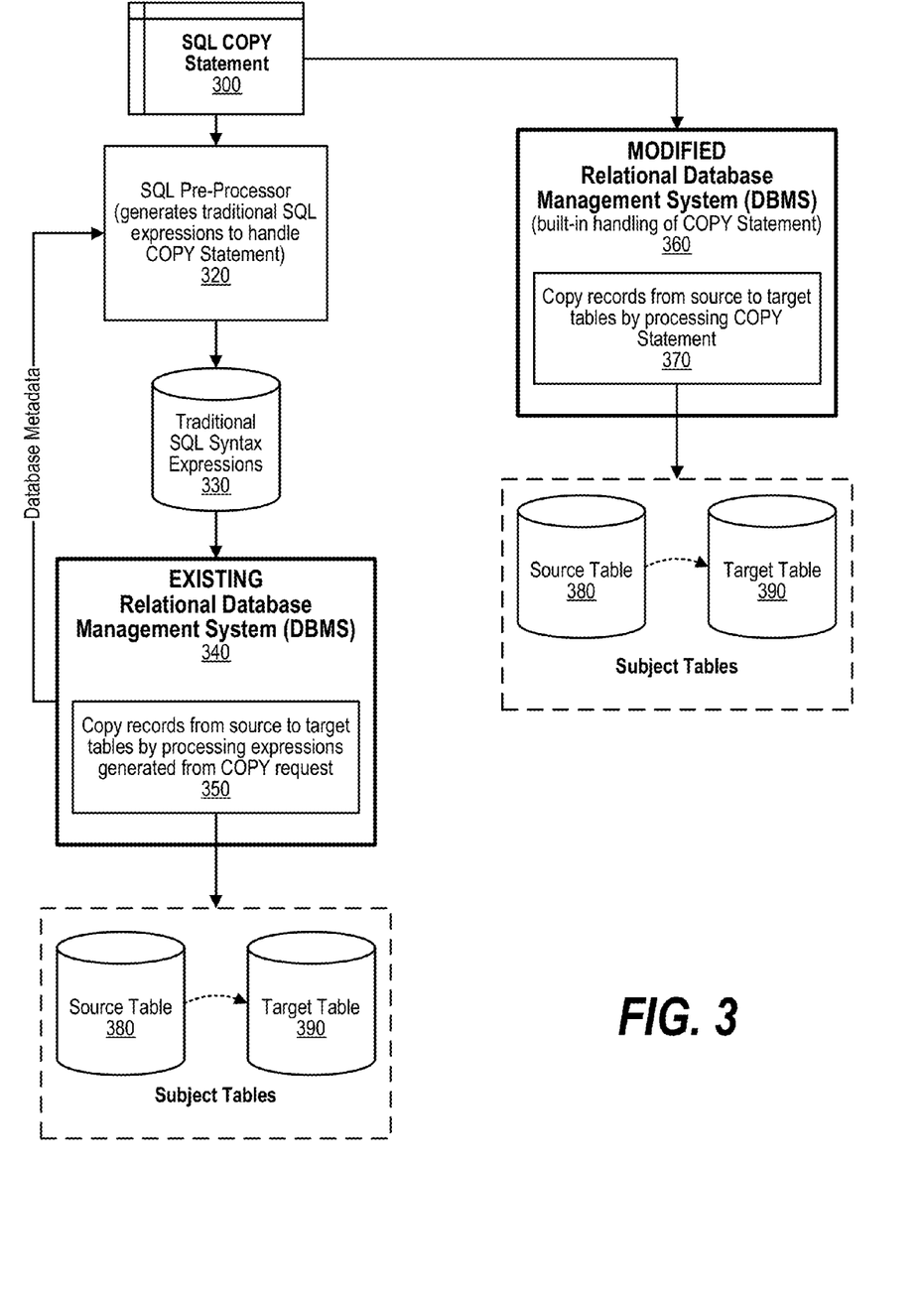
FIG. 3 is a high level diagram showing the overall processing of Structured Query Language (SQL) expressions with flexible COPY statement usage.

FIG. 3 is a high level diagram showing the overall processing of Structured Query Language (SQL) expressions with flexible COPY statement usage. Memory area 300 depicts an SQL COPY statement that has been prepared for processing in order to copy data from a source table to a target table. The SQL COPY statement is written using the syntax described in the previous section. Memory area 300 might originate from a data store where the COPY instruction is stored or may be the result of an ad-hoc query performed by a user.

In one embodiment, the SQL COPY statement is processed by SQL pre-processor 320 which is a process that reads the SQL COPY statement from memory area 300 and also retrieves database metadata from an existing (e.g., traditional, etc.) database management system (DBMS), such as DBMS 340. The database metadata includes attributes pertaining to database tables managed by the DBMS, including the source table used in the COPY statement. These attributes include the column names pertaining to the source tables. In the embodiment that utilizes SQL pre-processor 320, the SQL pre-processor generates SQL statements from the SQL COPY statements read from data store 300 with the generated SQL statements including SQL INSERT INTO and SQL SELECT statements that are derived from the COPY statement by the SQL pre-processor. The generated SQL statements are "traditional" SQL statements that can be processed by an existing relational DBMS. The generated SQL statements are stored in data store 330 which is used as an input to DBMS 340. At step 350, DBMS 340 copies records from source table 380 to target table 390 using the traditional SQL statements stored in data store 330. Note that target table may be an empty table or could be an existing database table that is receiving additional data from the source table.

In a second embodiment, the SQL statements are processed by modified relational DBMS 360 which has been modified to process the SQL COPY statement without use of an SQL pre-processor. In this embodiment, the modified relational DBMS reads the SQL COPY statement from memory area 300 and, at step 370, the modified DBMS copies records from source table 380 to target table 390 by processing the COPY statement. Again, note that target table may be a newly created table or could be an existing database table that is receiving additional data from the source table.

Figure 4:
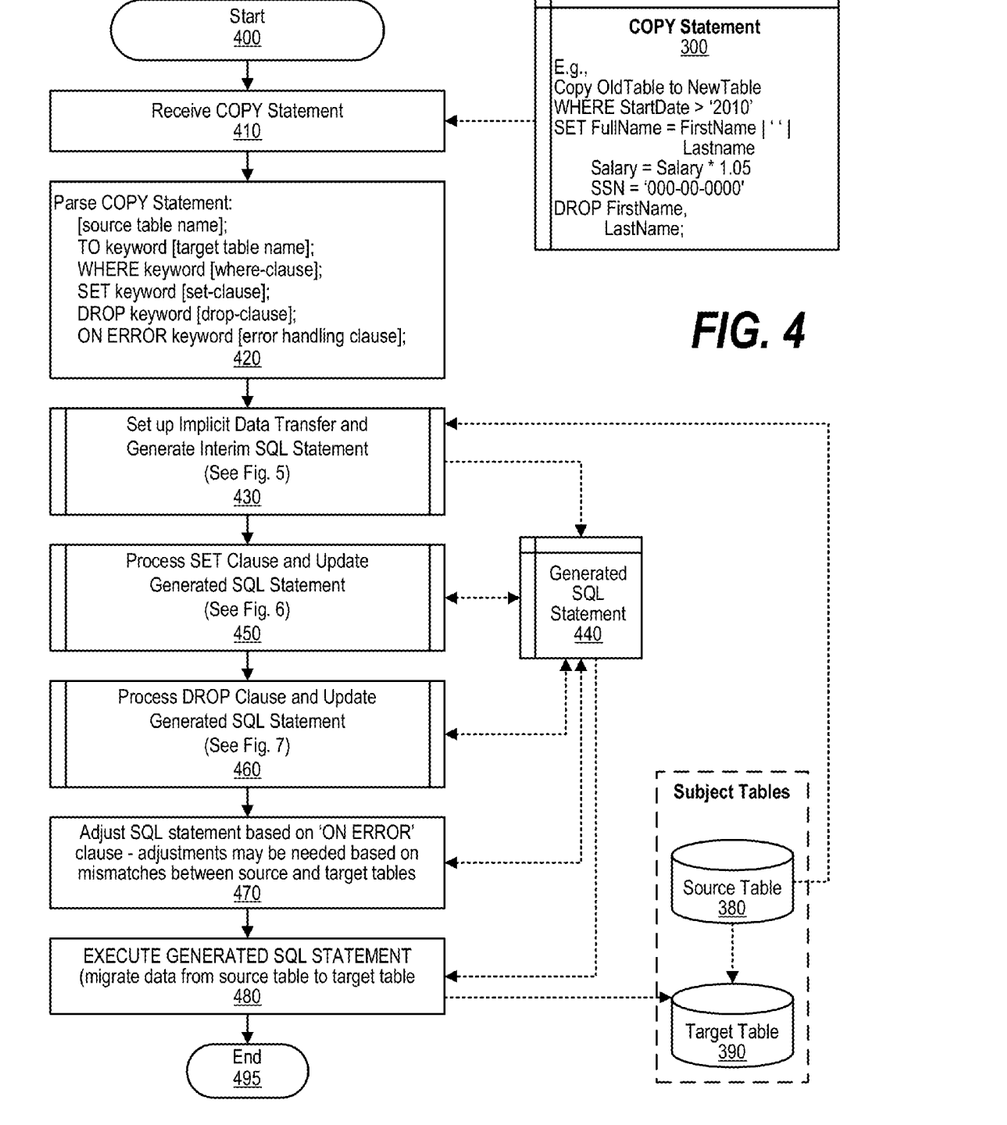
FIG. 4 is a depiction of a flowchart showing the logic used implementing an embodiment of the COPY statement to copy data between relational database tables.

FIG. 4 is a depiction of a flowchart showing the logic used implementing an embodiment of the COPY statement to copy data between relational database tables. Processing commences at 400 whereupon, at step 410, the process receives a COPY statement such as the COPY statement shown in memory area 300. Note that the COPY statement shown in memory area 300 is substantially similar to the COPY statement example previously shown and described in the section describing FIGS. 3-7, above.

Returning to FIG. 4, at step 420, the COPY statement is parsed into its component parts based on the syntax of the statement. In one embodiment, the COPY statement includes parameters of the source table name, the target table name, an optional WHERE clause, an optional SET clause, an optional DROP clause, and an optional ON ERROR clause. The WHERE clause, if present, specifies that rows from the source table that meet specified criteria should be copied to the target table. In the example shown, only those employees with a StartDate>'2010' are being copied to the target table. The criteria for the where-clause are expressed in the form of predicates. The WHERE clause is not a mandatory clause of the SQL COPY statement, but can be used to limit the number of rows copied as a result of the statement. The SET clause is identified by the SET keyword and followed by one or more SET clause predicates to manipulate data between source columns and target columns during the data transfer. In the example shown, the SET clause predicates include "FullName=FirstName|"|Lastname" which concatenates the first and last name fields into a new an existing target table column named FullName, "Salary=Salary*1.05" which increases the salaries by five percent and implicitly changes the data type of the target column to floating point if necessary, and "SSN='000-00-0000'" which hides the returned social security numbers by changing the returned social security numbers to the specified set of zeros. The DROP clause is identified by the DROP keyword and followed by one or more DROP clause predicates to specify columns from the source table that are to be dropped (not copied) to the target table. In the example, the FirstName and LastName columns are being explicitly dropped and excluded from the data transfer via the DROP clause because these fields have been combined in a new into an existing target table column called FullName.

Figure 5:
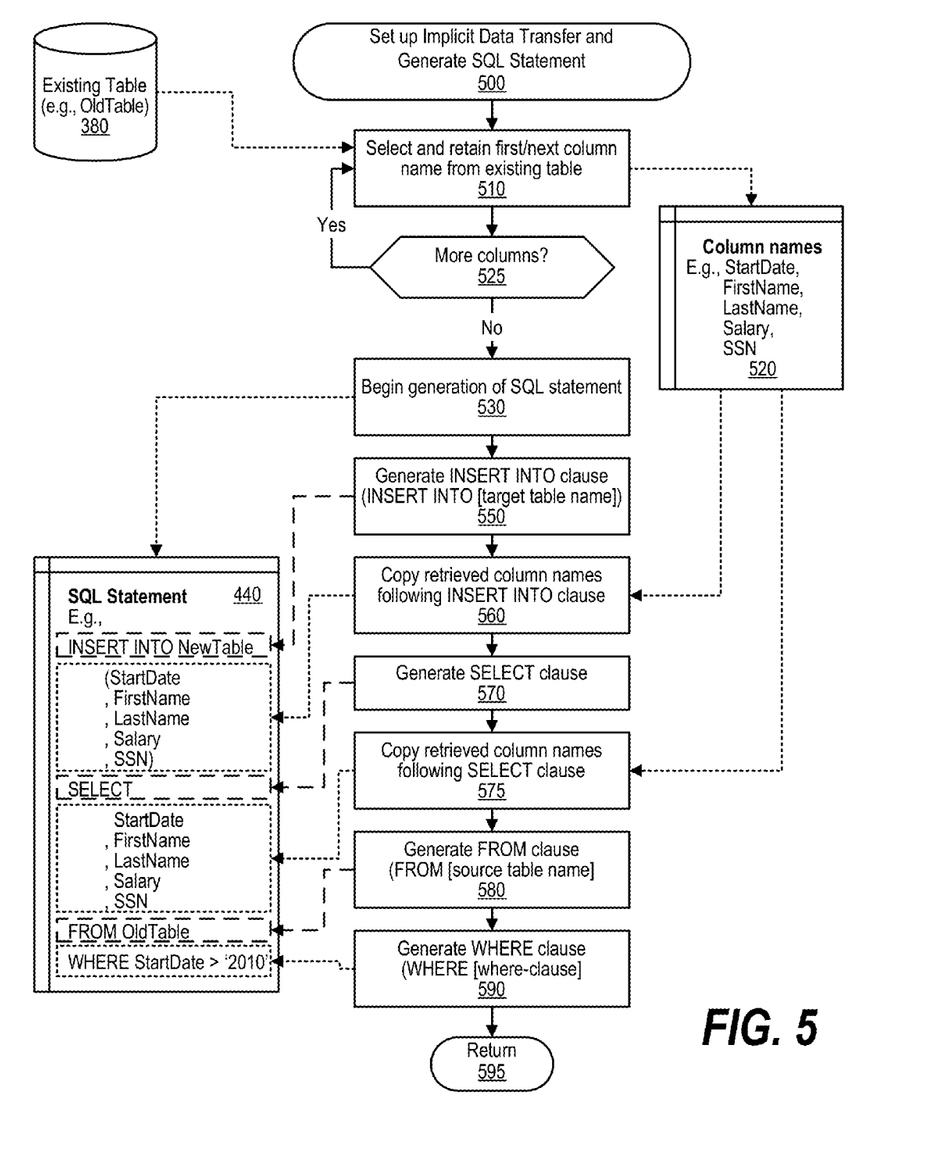
FIG. 5 is a depiction of a flowchart showing the logic used to set up implicit data transfer and generate an interim SQL statement.

At predefined process 430, the process sets up the implicit data transfer between the source table and the target table and generates an SQL statement (Generated SQL Statement stored in memory area 440) that will be used to perform the transfer (see FIG. 5 and corresponding text for processing details). At predefined process 450, the routine processes any SET clauses found in the COPY statement and updates the generated SQL statement (Generated SQL Statement stored in memory area 440) accordingly (see FIG. 6 and corresponding text for processing details). At predefined process 460, the routine processes any DROP clauses found in the COPY statement and updates the generated SQL statement (Generated SQL Statement stored in memory area 440) accordingly (see FIG. 7 and corresponding text for processing details).

At step 470, the process adjusts the generated SQL statement stored in memory area 440 based on any 'ON ERROR' clauses found in the COPY statement. For example, adjustments may be needed based on any mismatches found between the source and target tables. Finally, at step 480, the process executes the generated SQL statement stored in memory area 440 which results in data being copied from source table 380 to target table 390 based on the parameters included in the original COPY statement. Processing thereafter ends at 495.

FIG. 5 is a depiction of a flowchart showing the logic used to set up implicit data transfer and generate an interim SQL statement. This routine is called from the routine shown in FIG. 4 (see predefined process 430). Processing of the routine commences at 500 whereupon, at step 510, the process selects the first column name from source table 380 by receiving metadata pertaining to the source table from the database management system (DBMS) where the source table resides. The selected source column name is retained in column names memory area 520. A decision is made as to whether there are more columns in the source table that need to be processed (decision 525). If there are more columns in the source table to process, then decision 525 branches to the "yes" branch which loops back to select and retain the next column name from the source table. This looping continues until all of the source column names pertaining to the source table have been retrieved and stored in memory area 520, at which point decision 525 branches to the "no" branch for further processing by the routine.

At step 530, the routine begins generating the SQL statement that will be used to copy the records from the source table to the target table. In one embodiment, memory area 440 used to store the SQL statement is allocated at step 530. At step 550, the routine generates an INSERT INTO clause with the name of the target table (e.g., "INSERT INTO Target-Table", etc.). At step 560, the column names that were retained by step 510 are retrieved and copied into the generated SQL statement following the INSERT INTO clause. At step 570, the routine generates the SELECT clause in the generated SQL statement as shown. At step 575, the column names that were retained by step 510 are retrieved and copied into the generated SQL statement following the SELECT clause. At step 580, the routine generates the FROM clause that identifies the name of the source table (e.g., "FROM SourceTable", etc.). At step 590, if a WHERE clause was included in the COPY statement, the WHERE clause is copied to the generated SQL statement as shown. Processing then returns to the calling routine (see FIG. 4) at 595.

Figure 6:
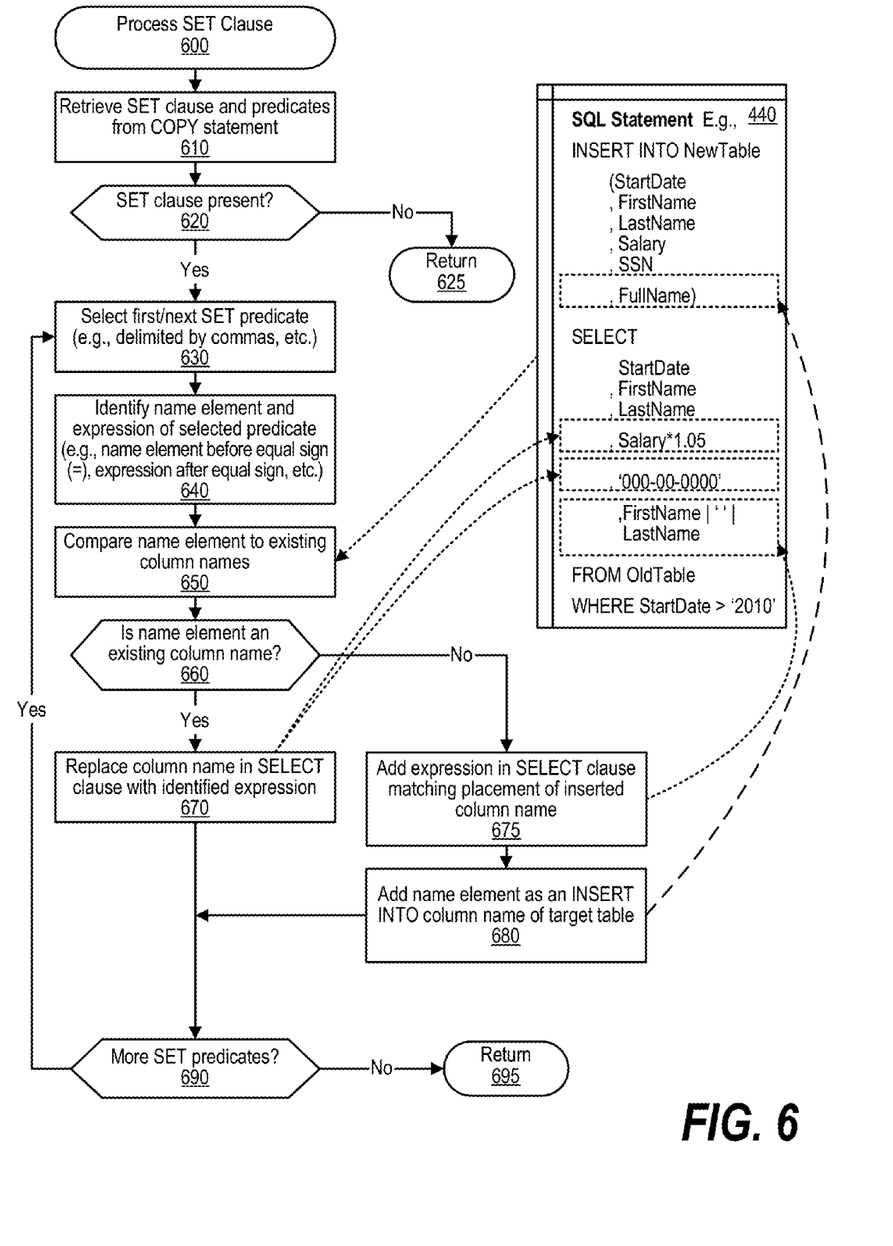
FIG. 6 is a depiction of a flowchart showing the logic used to process the SET clause within a COPY statement and update the generated SQL statement.

FIG. 6 is a depiction of a flowchart showing the logic used to process the SET clause within a COPY statement and update the generated SQL statement. This routine is called from the routine shown in FIG. 4 (see predefined process 450). Processing of the routine commences at 600 whereupon, at step 610, the routine retrieves any SET clause and predicates from the COPY statement. Because the SET clause is optional, a decision is made as to whether a SET clause is present in the COPY statement (decision 620). If a SET clause is not present in the COPY statement, then decision 620 branches to the "no" branch whereupon processing returns to the calling routine (see FIG. 4) at 625. On the other hand, if a SET clause is present in the COPY statement, then decision 620 branches to the "yes" branch in order to process the SET clause.

At step 630, the first SET clause predicate is selected. In one embodiment, SET clause predicates are delimited by commas. At step 640, the routine identifies the name element in the SET predicate as well as the expression element of the selected SET predicate (e.g., name element before equal sign (=), expression element after equal sign, etc.). At step 650, the name element identified in the SET predicate is compared to the set of source column names that follow the SELECT clause. A decision is made as to whether the name element is an existing source column name (decision 660). If the name element is an existing source column name, then decision 660 branches to the "yes" branch whereupon, at step 670, the matching source column name within the SELECT clause is replaced with the identified expression element. In the example shown, the source column name element "Salary" has been replaced with the expression element "Salary*1.05" and the source column name element "SSN" has been replaced with the expression element '000-00-0000' per the SET clause predicates found in the COPY statement (see COPY statement 300 on FIG. 4).

Returning to decision 660, if the name element is not an existing source column name, then decision 660 branches to the "no" branch whereupon, at step 675, an expression is added to the SELECT clause with the expression element. In the example shown, the added expression element is a formula concatenating the first name with the last name, so the expression element is "FirstName concat"concat LastName". At step 680, the name element is added under the INSERT INTO clause pertaining to the target name. Here, the concatenated name (first name concatenated with last name) is being named "FullName", so the name element FullName is added under the INSERT INTO clause. As shown, the placement of the name element added to the INSERT INTO clause matches the placement of the expression element added to the SELECT clause. In the example shown, each is added to the sixth place (position) of the respective clause.

After the selected SET predicate has been processed, a decision is made as to whether there are more SET predicates in the SET clause that need to be processed (decision 690). If there are more SET predicates to process, then decision 690 branches to the "yes" branch which loops back to select and process the next SET predicate as described above. This looping continues until each of the SET predicates has been processed, at which point decision 690 branches to the "no" branch and processing returns to the calling routine (see FIG. 4) at 695.

Figure 7:
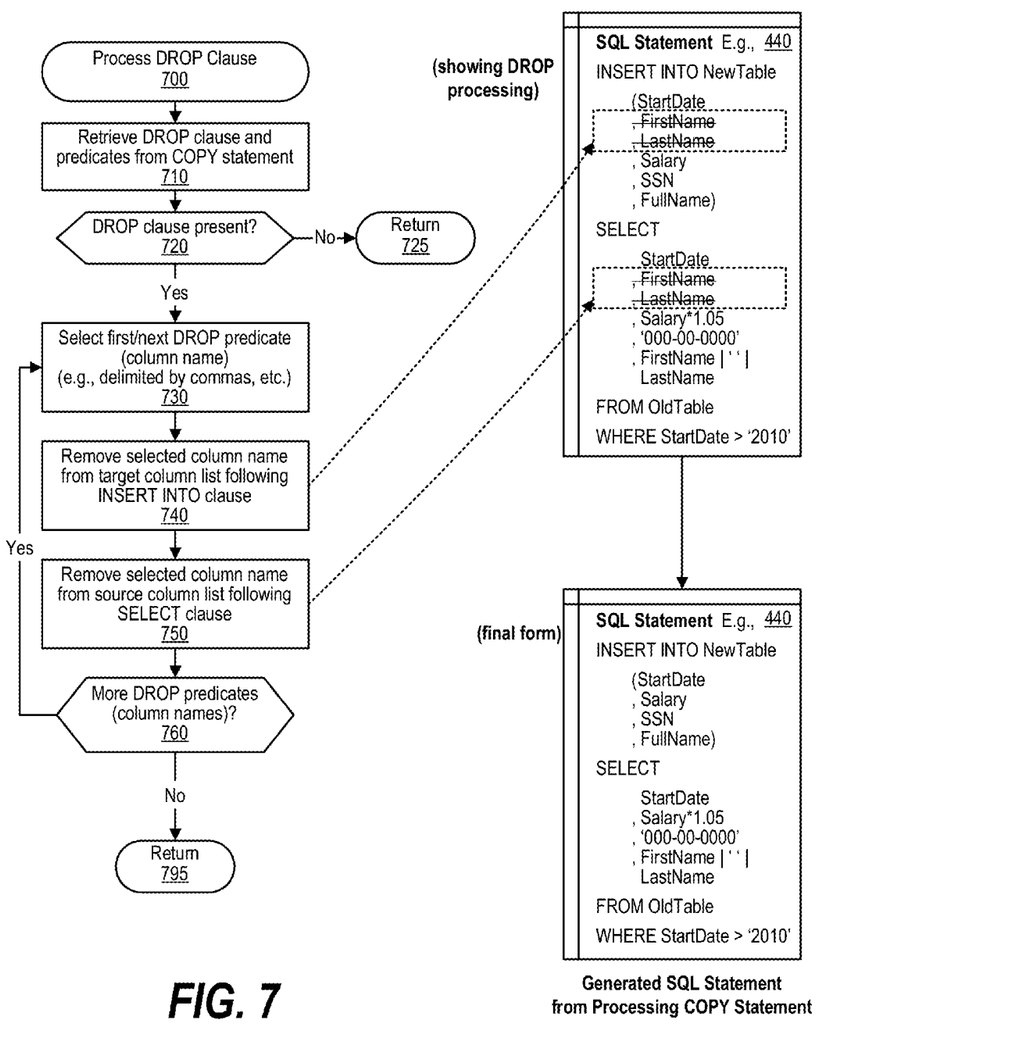
FIG. 7 is a depiction of a flowchart showing the logic used to process the DROP clause within a COPY statement and update the generated SQL statement.

FIG. 7 is a depiction of a flowchart showing the logic used to process the DROP clause within a COPY statement and update the generated SQL statement. This routine is called from the routine shown in FIG. 4 (see predefined process 460). Processing of the routine commences at 700 whereupon, at step 710, the routine retrieves any DROP clause and predicates from the COPY statement. Because the DROP clause is optional, a decision is made as to whether a DROP clause is present in the COPY statement (decision 720). If a DROP clause is not present in the COPY statement, then decision 720 branches to the "no" branch whereupon processing returns to the calling routine (see FIG. 4) at 725. On the other hand, if a DROP clause is present in the COPY statement, then decision 720 branches to the "yes" branch in order to process the DROP clause.

At step 730, the first DROP clause predicate (column name) is selected. The DROP clause predicate is a column name that is being removed from the copy operation. In one embodiment, DROP clause predicates (column names) are delimited by commas. At step 740, the routine removes the selected column name from the target table column list following the INSERT INTO clause. At step 750, the routine removes the selected column name from the source table column list following the SELECT clause. The top depiction of SQL statement memory area 440 shows the column names being removed from the INSERT INTO and SELECT clauses (removed columns shown with strikethrough formatting).

After the selected DROP predicate (column name) has been processed, a decision is made as to whether there are more columns to remove by checking for more DROP predicates (column names) in the DROP clause (decision 760). If there are more DROP predicates (column names) to process, then decision 760 branches to the "yes" branch which loops back to select and process the next DROP predicate (column name) as described above. This looping continues until each of the DROP predicates has been processed, at which point decision 760 branches to the "no" branch and processing returns to the calling routine (see FIG. 4) at 795. Note that the bottom depiction of SQL statement memory area 440 shows the final form of the generated SQL statement that is ready to be executed by the DBMS.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system, that copies records between tables in a relational database, the method comprising:

receiving a Structured Query Language (SQL) table COPY statement, wherein the COPY statement is devoid of an INSERT clause and identifies a source table and a target table;

retrieving a plurality of column names from a metadata corresponding to the source table; and generating an SQL statement, based upon the COPY statement, that includes an INSERT INTO clause pertaining to the target table and a SELECT clause pertaining to the source table, wherein the INSERT INTO clause includes a set of target column names corresponding to the plurality of column names, and wherein the SELECT clause includes a set of corresponding source column names.

2. The method of claim 1, wherein the COPY statement further identifies a SET clause, the method further comprising:

receiving a SET clause predicate corresponding to the identified SET clause, wherein the SET clause predicate includes a name element and an expression element;

comparing the name element to the set of source column names;

in response to the name element matching one of the source column names, replacing the matching source column name in the SELECT clause with the expression element; and in response to the name element failing to match one of the source column names:
  adding the name element to the set of target names included in the INSERT INTO clause; and
  adding the expression element to the set of source names included in the SELECT clause, wherein placement of the expression element within the SELECT clause matches placement of the name element in the INSERT INTO clause.

3. The method of claim 1, wherein the COPY statement further identifies a DROP clause, the method further comprising:
  receiving a DROP clause predicate corresponding to the identified DROP clause, wherein the DROP clause predicate identifies a drop column name;
  removing one of the source column names from the SELECT clause, wherein the removed source column name matches the drop column name; and
  removing one of the target column names from the INSERT INTO clause, wherein the removed target column name matches the drop column name.

4. The method of claim 1 wherein the COPY statement further identifies a WHERE clause that includes a WHERE clause expression, the method further comprising:
  including the WHERE clause in the generated SQL statement.

5. The method of claim 1, wherein the COPY statement further identifies a ON ERROR clause, the method further comprising:
  identifying one or more mismatches between the source table and the target table; and
  adjusting the generated SQL statement based on the ON ERROR clause and the identified mismatches.

6. The method of claim 1, wherein the COPY statement further identifies a SET clause, a DROP clause, and a WHERE clause that includes a WHERE clause expression, wherein the method further comprises:
  receiving a SET clause predicate corresponding to the identified SET clause, wherein the SET clause predicate includes a name element and an expression element;
  comparing the name element to the set of source column names;
  in response to the name element matching one of the source column names, replacing the matching source column name in the SELECT clause with the expression element;
  in response to the name element failing to match one of the source column names:
    adding the name element to the set of target names included in the INSERT INTO clause; and
    adding the expression element to the set of source names included in the SELECT clause, wherein placement of the expression element within the SELECT clause matches placement of the name element in the INSERT INTO clause;
  receiving a DROP clause predicate corresponding to the identified DROP clause, wherein the DROP clause predicate identifies a drop column name;
  removing one of the source column names from the SELECT clause, wherein the removed source column name matches the drop column name; and
  removing one of the target column names from the INSERT INTO clause, wherein the removed target column name matches the drop column name;
  including the WHERE clause in the generated SQL statement.

7. The method of claim 6, wherein the generated SQL statement is executed by a COPY statement processor that is built into a relational database management system (DBMS), and wherein the method further comprises:
  executing the generated SQL statement by the DBMS, wherein the executing results in a set of data being copied from the source table to the target table.

8. The method of claim 6 wherein the SQL statement is generated by an SQL pre-processor process, and wherein the method further comprises:
  executing the generated SQL statement by a relational database management system (DBMS) wherein the executing results in a set of data being copied from the source table to the target table.

9. An information handling system comprising:
  a plurality of processors;
  a memory coupled to at least one of the processors;
  a set of instructions stored in the memory and executed by at least one of the processors to copy records between tables in a relational database, wherein the set of instructions perform actions of:
    receiving a Structured Query Language (SQL) table COPY statement, wherein the COPY statement is devoid of an INSERT clause and identifies a source table and a target table;
    retrieving a plurality of column names from a metadata corresponding to the source table; and
    generating an SQL statement, based upon the COPY statement, that includes an INSERT INTO clause pertaining to the target table and a SELECT clause pertaining to the source table, wherein the INSERT INTO clause includes a set of target column names corresponding to the plurality of column names, and wherein the SELECT clause includes a set of corresponding source column names.

10. The information handling system of claim 9, wherein the COPY statement further identifies a SET clause, and wherein the actions performed further comprise:
  receiving a SET clause predicate corresponding to the identified SET clause, wherein the SET clause predicate includes a name element and an expression element;
  comparing the name element to the set of source column names;
  in response to the name element matching one of the source column names, replacing the matching source column name in the SELECT clause with the expression element; and
  in response to the name element failing to match one of the source column names:
    adding the name element to the set of target names included in the INSERT INTO clause; and
    adding the expression element to the set of source names included in the SELECT clause, wherein placement of the expression element within the SELECT clause matches placement of the name element in the INSERT INTO clause.

11. The information handling system of claim 9, wherein the COPY statement further identifies a DROP clause, and wherein the actions performed further comprise:
  receiving a DROP clause predicate corresponding to the identified DROP clause, wherein the DROP clause predicate identifies a drop column name;

removing one of the source column names from the SELECT clause, wherein the removed source column name matches the drop column name; and removing one of the target column names from the INSERT INTO clause, wherein the removed target column name matches the drop column name.

12. The information handling system of claim 9 wherein the COPY statement further identifies a WHERE clause that includes a WHERE clause expression, and wherein the actions performed further comprise:

including the WHERE clause in the generated SQL statement.

13. The information handling system of claim 9, wherein the COPY statement further identifies a ON ERROR clause, and wherein the actions performed further comprise:

identifying one or more mismatches between the source table and the target table; and adjusting the generated SQL statement based on the ON ERROR clause and the identified mismatches.

14. The information handling system of claim 9, wherein the COPY statement further identifies a SET clause, a DROP clause, and a WHERE clause that includes a WHERE clause expression, and wherein the actions performed further comprise:

receiving a SET clause predicate corresponding to the identified SET clause, wherein the SET clause predicate includes a name element and an expression element;

comparing the name element to the set of source column names;

in response to the name element matching one of the source column names, replacing the matching source column name in the SELECT clause with the expression element;

in response to the name element failing to match one of the source column names:

adding the name element to the set of target names included in the INSERT INTO clause; and adding the expression element to the set of source names included in the SELECT clause, wherein placement of the expression element within the SELECT clause matches placement of the name element in the INSERT INTO clause;

receiving a DROP clause predicate corresponding to the identified DROP clause, wherein the DROP clause predicate identifies a drop column name;

removing one of the source column names from the SELECT clause, wherein the removed source column name matches the drop column name; and removing one of the target column names from the INSERT INTO clause, wherein the removed target column name matches the drop column name;

including the WHERE clause in the generated SQL statement.

15. A computer program product stored in a computer readable device, comprising computer instructions that, when executed by an information handling system, causes the information handling system to copy records between tables in a relational database by performing actions comprising:

receiving a Structured Query Language (SQL) table COPY statement, wherein the COPY statement is devoid of an INSERT clause and identifies a source table and a target table;

retrieving a plurality of column names from a metadata corresponding to the source table; and generating an SQL statement, based upon the COPY statement, that includes an INSERT INTO clause pertaining to the target table and a SELECT clause pertaining to the source table, wherein the INSERT INTO clause includes a set of target column names corresponding to the plurality of column names, and wherein the SELECT clause includes a set of corresponding source column names.

16. The computer program product of claim 15, wherein the COPY statement further identifies a SET clause, and wherein the actions further comprise:

receiving a SET clause predicate corresponding to the identified SET clause, wherein the SET clause predicate includes a name element and an expression element;

comparing the name element to the set of source column names;

in response to the name element matching one of the source column names, replacing the matching source column name in the SELECT clause with the expression element; and in response to the name element failing to match one of the source column names:

adding the name element to the set of target names included in the INSERT INTO clause; and adding the expression element to the set of source names included in the SELECT clause, wherein placement of the expression element within the SELECT clause matches placement of the name element in the INSERT INTO clause.

17. The computer program product of claim 15, wherein the COPY statement further identifies a DROP clause, and wherein the actions further comprise:

receiving a DROP clause predicate corresponding to the identified DROP clause, wherein the DROP clause predicate identifies a drop column name;

removing one of the source column names from the SELECT clause, wherein the removed source column name matches the drop column name; and removing one of the target column names from the INSERT INTO clause, wherein the removed target column name matches the drop column name.

18. The computer program product of claim 15 wherein the COPY statement further identifies a WHERE clause that includes a WHERE clause expression, and wherein the actions further comprise:

including the WHERE clause in the generated SQL statement.

19. The computer program product of claim 15, wherein the COPY statement further identifies a ON ERROR clause, and wherein the actions further comprise:

identifying one or more mismatches between the source table and the target table; and adjusting the generated SQL statement based on the ON ERROR clause and the identified mismatches.

20. The computer program product of claim 15, wherein the COPY statement further identifies a SET clause, a DROP clause, and a WHERE clause that includes a WHERE clause expression, and wherein the actions further comprise:

receiving a SET clause predicate corresponding to the identified SET clause, wherein the SET clause predicate includes a name element and an expression element;

comparing the name element to the set of source column names;

in response to the name element matching one of the source column names, replacing the matching source column name in the SELECT clause with the expression element;

in response to the name element failing to match one of the source column names:
- adding the name element to the set of target names included in the INSERT INTO clause; and
- adding the expression element to the set of source names included in the SELECT clause, wherein placement of the expression element within the SELECT clause matches placement of the name element in the INSERT INTO clause;

receiving a DROP clause predicate corresponding to the identified DROP clause, wherein the DROP clause predicate identifies a drop column name;

removing one of the source column names from the SELECT clause, wherein the removed source column name matches the drop column name; and removing one of the target column names from the INSERT INTO clause, wherein the removed target column name matches the drop column name;

including the WHERE clause in the generated SQL statement.

* * * * *